(12) United States Patent
Gleeson et al.

(10) Patent No.: US 6,562,444 B1
(45) Date of Patent: May 13, 2003

(54) FIBER-CEMENT/GYPSUM LAMINATE COMPOSITE BUILDING MATERIAL

(75) Inventors: James A. Gleeson, Alta Loma, CA (US); Mark T. Fisher, Huntington Beach, CA (US); Donald J. Merkley, Alta Loma, CA (US)

(73) Assignee: James Hardie Research Pty Limited (AU)

( * ) Notice: Subject to any disclaimer, the term of this patent is extended or adjusted under 35 U.S.C. 154(b) by 67 days.

(21) Appl. No.: 09/685,637

(22) Filed: Oct. 10, 2000

Related U.S. Application Data
(60) Provisional application No. 60/158,600, filed on Oct. 8, 1999.

(51) Int. Cl.$^7$ ................................................. B32B 7/02
(52) U.S. Cl. ..................... 428/214; 428/294.7; 428/220; 428/312.2; 428/332; 428/359; 428/364; 52/782.1; 52/783.1
(58) Field of Search .................................. 428/215, 220, 428/241, 312.2, 312.4, 294.7, 332, 359, 364, 214; 52/782.1, 783.1

(56) References Cited

U.S. PATENT DOCUMENTS

| | | |
|---|---|---|
| 4,104,103 A | 8/1978 | Tarullo |
| 4,343,127 A | 8/1982 | Greve et al. |
| 4,361,616 A * | 11/1982 | Bomers |
| 4,748,771 A | 6/1988 | Lehnert et al. |
| 4,811,538 A | 3/1989 | Lehnert et al. |
| 4,841,702 A | 6/1989 | Huettemann |
| 4,937,993 A | 7/1990 | Hitchins |
| 5,305,577 A | 4/1994 | Richards et al. |
| 5,395,685 A * | 3/1995 | Seth et al. |
| 5,697,189 A | 12/1997 | Miller et al. |
| 5,718,759 A | 2/1998 | Stav et al. |
| 5,735,092 A | 4/1998 | Clayton et al. |
| 5,743,056 A | 4/1998 | Balla-Goddard et al. |
| 5,791,109 A | 8/1998 | Lehnert et al. |
| 5,817,262 A | 10/1998 | Englert |
| 5,848,508 A | 12/1998 | Albrecht |
| 5,945,208 A | 8/1999 | Richards et al. |

FOREIGN PATENT DOCUMENTS

| | | |
|---|---|---|
| JP | 52051719 | 4/1977 |
| JP | 52052429 | 4/1977 |

OTHER PUBLICATIONS

Gypsum Association Manual, 14$^{th}$ Edition 1994, p. 33.

* cited by examiner

Primary Examiner—Merrick Dixon
(74) Attorney, Agent, or Firm—Knobbe, Martens, Olson & Bear, LLP

(57) ABSTRACT

A building material is provided in which fiber-cement is laminated to gypsum to form a single piece laminate composite. This single piece laminate composite exhibits improved fire resistance and surface abuse and impact resistance, but achieves these properties without the excessive weight and thickness of two piece systems. Additionally, because of the reduced thickness, the preferred laminate building material is easier to cut and is quicker and easier to install than two piece systems. Furthermore, forming the fiber-cement and gypsum into a single piece laminate eliminates the need to install two separate pieces of building material, thereby simplifying installation. In one embodiment, a ⅝" thick laminate composite is provided in which a ½" thick gypsum panel laminated to a ⅛" thick fiber-cement sheet, the laminate composite having a fire resistance rating of 1 hour when measured in accordance with ASTM E119-98.

20 Claims, 2 Drawing Sheets

FIBER-CEMENT/GYPSUM LAMINATE COMPOSITE BUILDING MATERIAL

This application claims the benefit of Provisional Application Ser. No. 60/158,600, filed Oct. 8, 1999.

BACKGROUND OF THE INVENTION

1. Field of the Invention

This invention relates to abuse resistant, impact resistant and fire resistant building materials, and more particularly, to a single piece laminate composite building material of fiber-cement and gypsum.

2. Description of the Related Art

The interior wallboard market has been dominated by the use of gypsum wallboard products for many years. The gypsum wallboard typically comprises thin paper layers wrapped around a gypsum core. For example, one paper layer covers the face and long edges of the board, and the second paper layer usually covers the back surface of the board. The core is predominantly gypsum, and can be modified with additives such as glass fiber, vermiculite and mica to improve fire resistance.

In addition to fire resistance, abuse resistance is another desired quality in wallboards. Gypsum has poor abuse resistance compared to other wallboard materials such as wood or masonry. The paper surface of gypsum wallboard is easily damaged by impact such as scuffing, indentation, cracking or penetration with hard or soft body objects such as furniture, trolleys, toys, sports equipment and other industrial or residential furnishings. Such wall abuse is typical in high traffic rooms such as corridors, family living areas, gymnasiums or change rooms.

Gypsum wallboard manufacturers have made modifications to their gypsum wallboards to improve their abuse resistance. One method was to bond a plastic film to the back of the wall panel to resist penetration of the impact bodies into the framed wall cavity. Another method was to make a fiber-gypsum wall panel with fiber-gypsum outer layers formed onto a gypsum-based core. These products typically have improved surface abuse resistance to the paper surface of normal gypsum wallboard. Similar gypsum-based or cement gypsum-based compositions are typically described in U.S. Pat. Nos. 5,817,262 and 5,718,759.

One material having significant abuse resistance is fiber-cement. Fiber cement has an advantage over gypsum panel with respect to surface abuse resistance such as wear and abrasion. One disadvantage of fiber cement by itself as a wall panel is that it does not have a fire resistance rating comparable to gypsum wall panels of equal thickness. Another disadvantage of fiber cement by itself is that it is significantly heavier than gypsum wall panels of equivalent thickness. For example, a 1 hour fire resistance-rated wall system with fiber cement requires mineral insulation in the wall cavity or a sub-layer of fire rated gypsum wall panel to achieve a 1 hour fire resistance rating when tested in accordance with ASTM E-119.

A 2-layer system of ¼" fiber cement over ⅝" type X fire rated gypsum wallboard has been used to achieve both fire resistance and abuse resistance. Such a system is described in Gypsum Association—Fire Resistance Design Manual—GA FILE NO. WP 1295—Gypsum wallboard, steel studs, fiber-cement board proprietary system. This two piece system is disadvantageous because it is significantly heavier than single-layer gypsum wallboards. Additionally, the 2-layer wallboards require nearly double the amount of labor for installation because two separate wall panels must be installed instead of a single panel. Also, the extra thickness of the 2-layer systems (⅝"+¼"=⅞") is not compatible with most doorjamb widths.

SUMMARY OF THE INVENTION

Accordingly, what is needed is a single piece building material that has good abuse resistance, impact resistance and fire resistance. This building material should also be light, easy to manufacture and compatible with standard building material sizes. With respect to fire resistance, it would be especially advantageous for such a material to have a fire resistance rating of at least one hour as measured by ASTM E119.

Briefly stated, the needs addressed above are satisfied in one embodiment by a building material comprising fiber-cement laminated to gypsum to form a single piece laminate composite. This single piece laminate composite exhibits improved fire resistance and surface abuse resistance, but achieves these properties without the excessive weight and thickness of two piece systems. Additionally, because of the reduced thickness, the preferred laminate building material is easier to cut and is quicker and easier to install than two piece systems. Furthermore, forming the fiber-cement and gypsum into a single piece laminate eliminates the need to install two separate pieces of building material, thereby simplifying installation.

One object of the invention is to provide a building board product suitable for applications requiring surface abuse resistance, improved impact resistance and a 1-hour fire resistance rating (as measured, for example, by ASTM E-119) without cavity insulation at a panel thickness of ⅝", installed on each side of a wall frame. The surface abuse resistance is measured by abrasion tests such as ASTM D4977-98b (Standard Test Method for Granule Adhesion to Mineral Surfaced Roofing) and also indentation tests such as ASTM D5420 (Impact Resistance of Flat, Rigid Plastic Specimen by Means of a Striker by a Falling Weight (Gardner Impact)). The panel impact resistance is typically measured by, for example, ASTM E695 (Measuring Relative Resistance of Wall, Floor and Roof Construction to Impact Loading), and ISO 7892 (Vertical Building Elements—Impact Resistance Tests—Impact Bodies and General Test Procedures), or other suitable impact or abrasion tests.

DETAILED DESCRIPTION OF THE PREFERRED EMBODIMENTS

The preferred embodiments of the present invention illustrated below describe a single piece laminate composite wallboard system. It will be appreciated, however, that the present invention is not limited to wallboards, but can be utilized for any application where an abuse resistant, impact resistant and fire resistant building material is desired.

Figure 1:
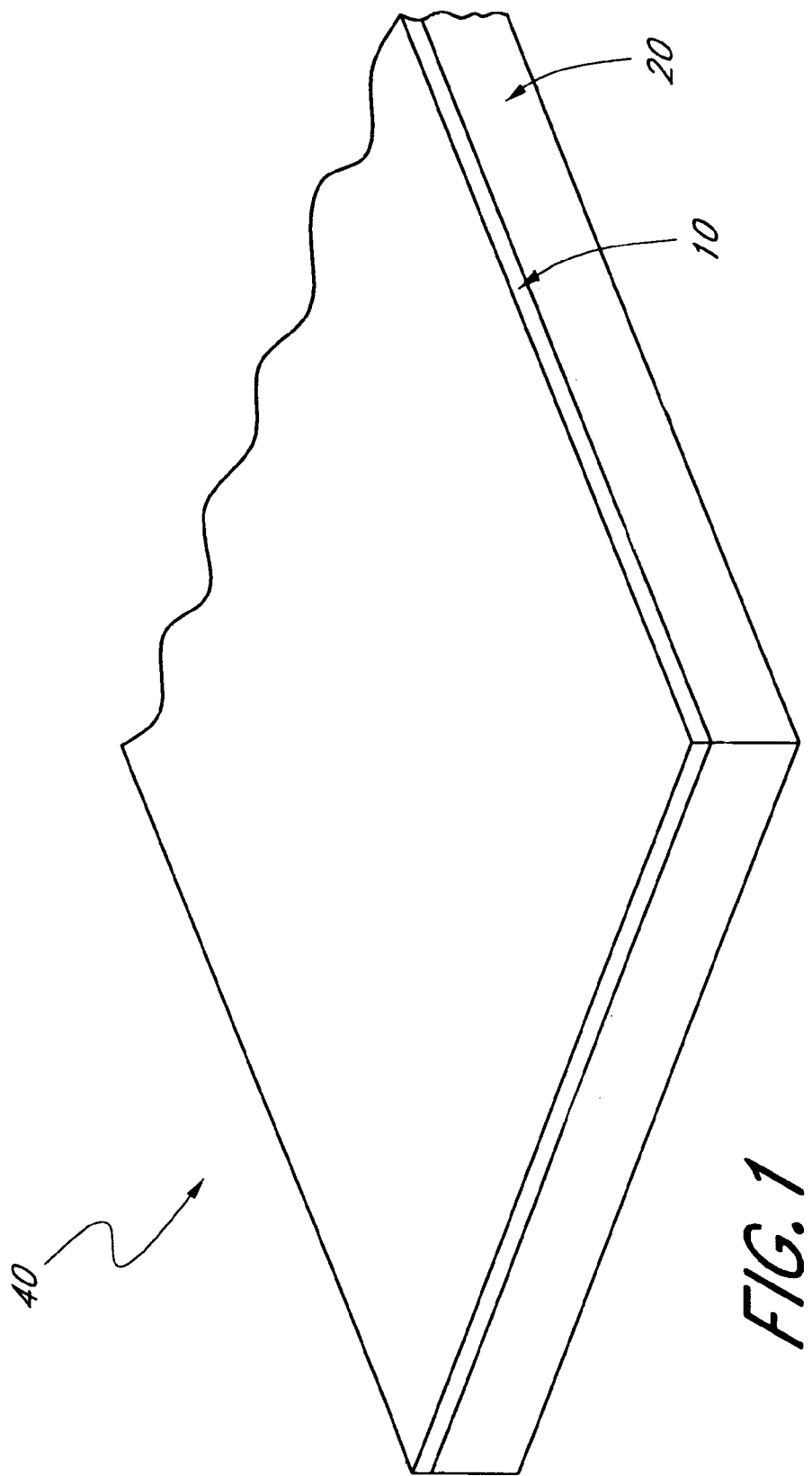
FIG. 1 is a perspective view of a single piece laminate composite comprising fiber-cement laminated to gypsum.
Figure 2:
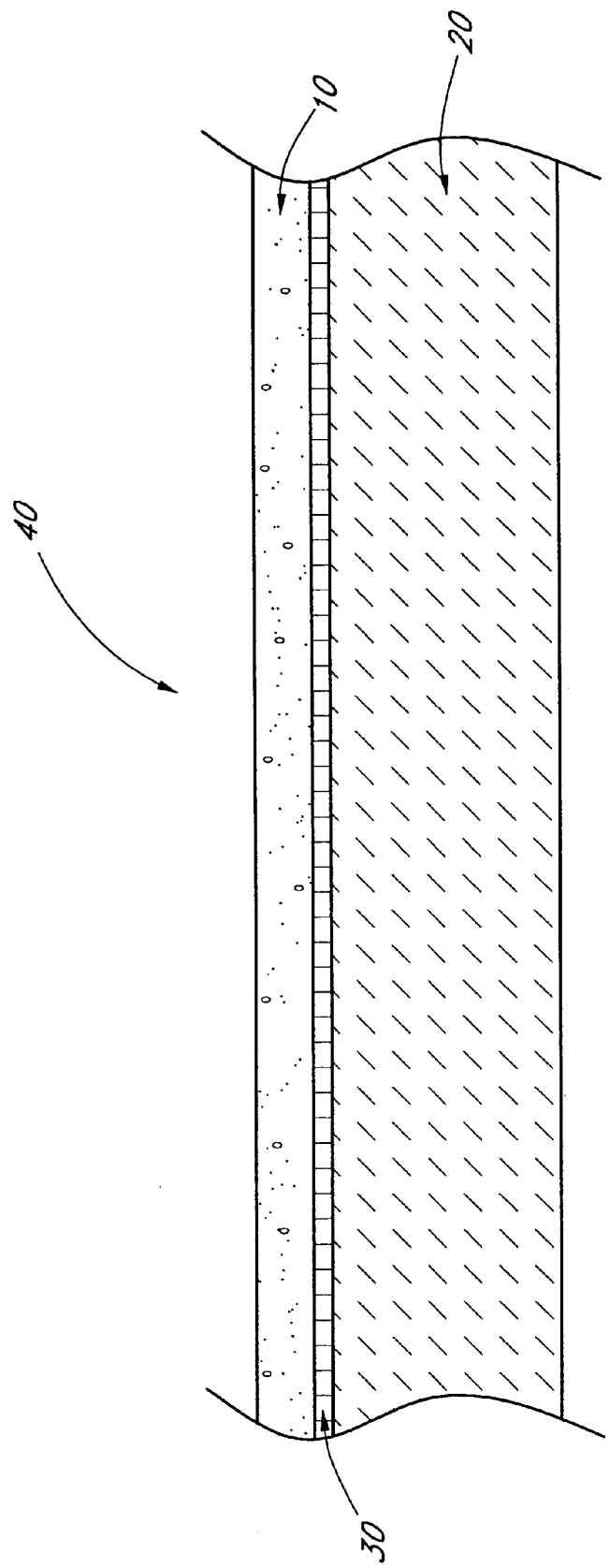
FIG. 2 is a cross-sectional view of the single piece laminate composite of FIG. 1, showing the fiber-cement and gypsum adhered together using an adhesive.

As seen in FIG. 1, a preferred building material 40 is comprised of a fiber-cement layer 10 laminated to gypsum layer 20, creating a single piece laminate composite. FIG. 2 illustrates that the fiber cement layer 10 may be laminated to the gypsum layer 20 using an adhesive 30, the thickness of which is exaggerated in FIG. 2 for illustration purposes, as described in further detail below. It will be appreciated that the fiber-cement and gypsum components can take any form necessary, including, but not limited to, panels, sheets, skins, boards, or the like. In one preferred embodiment, the thickness of a fiber-cement sheet 10 is between about 1/32" and 1/4". More preferably, the fiber-cement sheet 10 is about 1/8" thick, plus or minus about 1/16". A gypsum panel 20 typically has a thickness between about 1/4" to 3/4", more preferably about 1/2". It will be appreciated that other thicknesses for the fiber-cement sheet 10 and the gypsum panel 20 may be used. The preferred weight is about 2.5 to 3 lbs/square foot, more preferably about 2.77 lbs/square foot for a 5/8" thick composite wallboard.

One preferred embodiment of the invention is a composite panel that is manufactured by bonding together a paper-faced 1/2" type X gypsum wallboard to 1/8" thick fiber cement panel. ASTM C 36 describes a type X gypsum board to have not less than 45 minutes fire resistance rating for boards 1/2" thick, applied parallel with and on each side of load bearing 2"×4" wood studs spaced 16" on center with 6D coated nail, 1 7/8" long 0.095" diameter shank, 1/4" diameter head, spaced 7" on center with the gypsum joints staggered 16" on each side of the partition and tested in accordance with ASTM E 119. One preferred 1/2" Type X gypsum panel is a 1/2" thick HARDIROCK® MAX "C"™, described in the table below. This gypsum panel has an improved Type X fire resistance rated core and is manufactured for commercial projects where building codes require specific levels of fire resistance and sound reduction. The 5/8" thick board is designed to provide greater fire resistance than standard Fire X™ board and achieves fire and sound rating with less weight. Application information is available in the *Gypsum Association Fire Resistance Design Manual GA-600, Underwriter's Laboratories, Inc. Fire Resistance Directory*.

| HARDIROCK ® MAX "C" ™ | |
|---|---|
| THICKNESS inches (mm) | 1/2" (12.7 mm) |
| WIDTH feet (mm) | 4' (1219 mm) |
| STANDARD LENGTHS feet | 8', 9', 10' |
| STANDARD EDGES | Tapered or square |
| APPROX WEIGHT lbs/sq ft (kg/m²) | 1.8 lbs/sq ft (8.8 kg/m²) |
| ASTM SPECS | C 36 |

It will be appreciated that the face of the gypsum panel 20 bonded to the fiber-cement 10 does not necessarily require a paper face, and the gypsum panel 20 may be bonded directly to the fiber-cement 10. A preferred gypsum panel 20 may also have a glass or polymeric fiber mat or woven mesh combined into the panel on either the front or back surface, either on the outside or the inside of the paper. This can be done for two reasons. First, it can be used to improve the impact resistance of the gypsum panel 20 by itself. Second, it can be used to improve the impact resistance of the gypsum panel as part of the composite wallboard 40.

The preferred composite wallboard 40 can be utilized in most interior wallboard installations. The preferred composite wallboard 40 is installed such that the fiber-cement side of the wallboard 40 faces outward to provide an abrasion and indentation resistant surface to traffic, and the gypsum side of the wallboard 40 is installed against the supporting framing, with the synergistic combination of the fiber-cement and the gypsum wallboard providing the fire resistance rating and strength of the panel. Neither the preferably 1/2" gypsum panel 20 nor the preferably 1/8" fiber-cement sheet 10 provides the 1-hour fire resistance rating in isolation, but rather the combination of the two materials in a laminated composite 40 has been tested in a symmetrical wall system and achieved a 1 hour fire resistance rating on a typical steel framing used in commercial building partitions. Results of a fire resistance test conducted on this composite panel are provided below.

The supporting framing is typically 20 or 25 gauge steel framing, or wood framing such as 2"×4" Douglas Fir softwood. The wallboard 40 can be fastened to the steel studs with suitable screws such as 6 gauge×1 1/8" Type S Bugle Head drywall or self-drilling screws. The wallboard 40 can be fastened to wood studs with suitable nails or screws such as 1 3/4" long cup-head gypsum wallboard nails or 6 gauge× 1 1/8" Type S Bugle Head drywall screws. The preferred wallboard 40 is designed for use in wall assemblies that are subject to surface abuse and penetration. Such wall assemblies are typically found in schools, public housing, public buildings, interior garage walls, corridors, gymnasiums, change rooms, and correctional and healthcare facilities. The material can be cut with a carbide-tipped score and snap knife, power shears or circular saw optionally with dust control.

Fiber Cement

The art of manufacturing cellulose fiber reinforced cement for use in a fiber-cement sheet or skin 10 is described in the Australian Patent AU 515151 and U.S. Pat. No. 6,030,447, the entirety of which is incorporated by reference. Fiber cement has the attributes of durability, resistance to moisture damage, low maintenance, resistance to cracking, rotting or delamination, resistance to termites and non-combustibility. Thus, the fiber cement layer 10 resists damage from extended exposure to humidity, rain, snow, salt air and termites. The layer is dimensionally stable and under normal conditions will not crack, rot or delaminate.

The basic composition of a preferred fiber-cement panel 10 is about 20% to 60% Portland cement, about 20% to 70% ground silica sand, about 5% to 12% cellulose fiber, and about 0% to 6% select additives such as mineral oxides, mineral hydroxides and water. Platelet or fibrous additives, such as, for example, wollastonite, mica, glass fiber or mineral fiber, may be added to improve the thermal stability of the fiber-cement.

The dry density of a preferred fiber-cement panel 10 is typically about 1.3 to 1.4 g/cm³ but can be modified by pressing the material to dry densities up to 2.0 g/cm³ or by addition of density modifiers such as unexpanded or expanded vermiculite, perlite, clay, shale or low bulk density (about 0.06 to 0.7 g/cm³) calcium silicate hydrates.

The flexural strength of a preferred fiber-cement panel 10, typically based on Equilibrium Moisture Content in accordance with ASTM test method C1185, is 1850 psi along the panel, and 2500 psi across the panel.

A preferred fiber-cement panel 10 has a non-combustible surface and shows no flame support or loss of integrity when tested in accordance with ASTM test method E136. When tested in accordance with ASTM test method E84, a preferred fiber-cement panel 10 exhibits the following surface burning capabilities:

Flame spread: 0

Fuel Contributed: 0

Smoke Developed: 5.

Lamination Process

A preferred panel is comprised of a 1/8" nominal thickness fiber cement sheet laminated to a 1/2" thick type X fire resistant gypsum board. The gypsum panel is preferably manufactured with square edges. An adhesive 30 as shown in FIGS. 1 and 2 above such as polyvinyl acetate (PVA) is spread over the surface of the gypsum panel and 1/8" thick fiber cement is placed over the surface and is typically pressed at about 38 psi, in a stacked configuration, for approximately 30 minutes. One preferred adhesive is Sun Adhesives polyvinyl acetate (PVA) adhesive #54-3500 supplied by Sun Adhesives, a division of Patrick Industries. While the adhesive is most preferably a low cost adhesive such as PVA, other organic or inorganic adhesives may be used, such as water-based polymeric adhesives, solvent-based adhesives, thermostat adhesives, natural polymers such as modified starches, liquid moisture cure or reactive hot melt adhesives such as polyurethane, and heat or fire resistant adhesives.

The adhesive 30 is preferably applied by a roll-coater process whereby the gypsum panel 20 is preferably cleaned to remove dust and debris before the adhesive 30 is applied to the smooth face. The adhesive 30 is preferably spread evenly over the entire surface of the gypsum panel 20. The wet film thickness of the adhesive 30, when measured with a standard "wet film thickness gauge," will preferably not be less than about 4.5 mil and preferably will not exceed about 6 mil. The fiber-cement panel 10 is placed on top of the gypsum panel 20, which is coated with adhesive 30, squared to the edges of the gypsum panel 20, and then stacked. The completed stack is preferably cured in a press under a load of about 37.5±2.5 psi for preferably no less than about 30 minutes. The panels then preferably have the fiber cement surface sanded and the long edges machined with an abrasive wheel such as diamond grit to form a tapered edge. The machine sanding preferably utilizes three sanding heads. The grades of sanding belts preferably range from 40 grit to 220 grit. The long edges are machine tapered to allow for setting compound, joint reinforcing tape and finishing compounds during flush jointing on installation. The surface of the product is preferably sealed with an acrylic emulsion to reduce the surface water absorption to make it easier to paint and to improve paint adhesion.

The fiber-cement surface of the composite wallboard 40 may be optionally sealed with an acrylic sealer such as UCAR 701 to facilitate on the job finishing. This can be achieved with a suitable latex paint which may be sprayed, rolled or brush applied for wallpaper or texture finishes. It will also be appreciated that sanding the fiber-cement panel 10 is optional in order to improve the finish of the fiber-cement surface. Furthermore, it will be appreciated that sanding can be done before or after the fiber-cement panel 10 is laminated to the gypsum panel 20. It will be appreciated that a roll press lamination process may also be used, with a suitable pressure sensitive adhesive.

Testing

Abuse resistance tests were conducted on one preferred laminate composite panel. This preferred panel provided superior impact resistance to the common type X fire resistant gypsum wallboard. The preferred panel also has superior abrasion resistance to both the common type X fire resistant gypsum wallboard and the abuse resistant gypsum based panels.

A novel feature of the preferred embodiments of the present invention is that neither the ½" gypsum wallboard or the 1/8" fiber cement sheet, by themselves, provide altogether, the 1-hour fire resistance rating, surface abuse and impact resistance. However, laminating the two materials together provides the 1-hour fire resistance in a symmetrical wall system when tested to ASTM E119 and an improved level of surface abuse resistance and impact resistance.

It is believed that the preferred panel also has the advantages of improved flexural strength and nail pull through strength and less humidified deflection compared to the individual components of the preferred invention or a typical type X gypsum wallboard of the same thickness (5/8" thick).

The preferred composite also has the novel features of fire and abuse characteristics in a single wallboard or a single piece system. Prior fire resistance rated and abuse resistant systems that utilize fiber cement required a two layer system over the supporting framework. There is considerable advantage with the preferred composite in reduced material and quicker installation of a single piece system versus a 2-layer system. The two layer system required installation of 5/8" type X gypsum wallboard followed by the installation of ¼" fiber cement over the top. The total thickness of these 2 layers adds up to 7/8" of material versus 5/8" of material with the preferred laminated composite of the present invention.

Thus, in one embodiment the present invention provides a single piece system that is at least about one hour fire resistance-rated and abuse resistant. This reduces the amount of time to install compared to the 2 layer system, lowers the mass of the wall unit per square foot compared to the 2 layer system, and requires less fixtures per wall for installing panel compared to the 2 layer system. Moreover, the material is easily cut with power shears, which is a quick and easy method of cutting.

The material also is abrasion resistant, indentation resistant and impact resistant (soft body and hard body), as illustrated in the tables below.

Surface-abuse and impact resistance can be determined by methods used in such tests as ASTM D 4977-98b (Standard Test Method for Granule Adhesion to Mineral Surfaced Roofing by Abrasion), ASTM D 5420 (Impact Resistance of Flat, Rigid Plastic Specimen by Means of a Striker by a Falling Weight (Gardner Impact)), ASTM E 695 (Measuring Relative Resistance of Wall, Floor and Roof Construction to Impact Loading), ISO 7892 (Vertical Building Elements—Impact Resistance Tests—Impact Bodies and General Test Procedures), or other suitable impact or abrasion tests. Fire resistance can be measured by tests such as ASTM E 119 (Standard Test Methods for Fire Tests of Building Construction and Materials), UL263, UBC 7-1, NFPA 251, ANSI A2.1, or other suitable fire resistance tests. One 5/8" thick laminate composite embodiment, comprising 1/8" fiber-cement laminated on top of a ½ Hardirock Max "C" Gypsum panel, achieved superior abrasion and impact resistance as illustrated in the tables below.

TABLE 1

| ASTM D4977 - Wire Brush Surface Abrasion Test (Modified to have a total of 25 lbs load on brush) | | |
|---|---|---|
| Product | Abraded Depth (mm) | Abraded Depth (inches) |
| 5/8" laminate composite | 0.000 | 0.000 |
| 5/8" Type X Gypsum Board | 0.016 | 0.001 |

TABLE 2

ISO 7892 Section 4.3 - Hard Body/Impact Resistance Test
(Single Impact @ 10 ft. Height-22 ft.-lb. force)

| Product | Indentation Diameter (inches) | Indentation Depth (inches) |
|---|---|---|
| 5/8" laminated composite | 1.270 | 0.275 |
| 5/8" Type X Gypsum Board | 1.788 | 0.275 |

The hard body impact test was conducted with a 1 kg ball bearing as outlined in Section 4.3.1 through 4.3.5 of ISO 7892.

The panels tested were fastened to 20 gauge steel framing with studs at 16" on center. The 1/4" fiber cement panel was fastened with 7 gauge×1¼ C-Drill screw spaced at 8". The 5/8" Type X gypsum wallboard was fastened with 6 gauge× 1⅛" Type S Bugle Head screws spaced at 8" and the 1/8" fiber cement laminated on top of 1/2" Hardirock Max "C" gypsum wallboard was fastened with 6 gauge×1⅛" Type S Bugle Head screws spaced at 12".

TABLE 3

ASTM D5420 - Indentation Test/Gardner Impact Test

| Product | Indentation Depth (inches) |
|---|---|
| 5/8" laminated composite | 0.101 |
| 5/8" Type X Gypsum Board | 0.149 |

For the indentation test, ASTM D5420-96 Method GC was followed which specifies a 0.625 mm diameter striker orifice with a support plate hole close to the diameter of the striker, and a 2 lb. weight falling a distance of 36 inches giving a single energy impact of (72±1.8) ft.-lbs. Ten specimens were tested from each product and values in the table have been averaged for all 10.

TABLE 4

ASTM E695-79 - Soft Body Impact Resistance Test

| Product | Cumulative Impact Force (ft.-lbs.) | Single Impact Force (ft-lbs.) |
|---|---|---|
| 5/8" laminated composite | 180 | 210 |
| 5/8" Type X Gypsum Board | 60 | 90 |
| 1/4" Fiber-cement Panel | 60 | 90 |

The soft body impacter was fabricated according to the requirements of sections 5.2.1 through 5.2.4 of E695-79, filled to a gross weight of 60 lbs. The bag is supported as a pendulum, striking the panel midway between the stud and mid height of the test wall in 6" increments.

The cumulative impact was defined as the energy needed to reach "failure mode" either by "set deflection", face/back cracking, and/or stud deformation of >0.25". Upon reaching any of the previously defined failure mode(s), the weighted bag was raised an additional 6 inches in height to reach the "single impact energy" needed to reach a failure mode.

The cumulative impact was defined as the energy needed to reach "failure mode" either by: "set deflection", and face/back cracking, and/or stud deformation of >0.25". Upon reaching any of the previously defined failure mode (s), the weighted bag was raised an additional 6 inches in height to reach the "single impact energy" needed to reach a failure mode.

The size of the panels was 4'×8', and were fastened to 20-gauge steel framing at 24" on center. The 1/4" fiber cement panel was fastened with 7 gauge×1¼ C-Drill screw spaced at 8". The 5/8" Type X gypsum wallboard was fastened with 6 gauge×1⅛" Type S Bugle Head screws spaced at 8" and the 1/8" fiber cement laminated on top of 1/2" Hardirock Max "C" gypsum wallboard was fastened with 6 gauge×1⅛" Type S Bugle Head screws spaced at 12".

Results in the table are an average of 3 panels of each material tested.

Fire Resistance Testing

One embodiment of the present invention was tested for fire resistance according to ASTM E 119-98. This embodiment was tested as a dual wall assembly, comprising a cold side and hot side. Each test assembly consisted of a 10 ft ×10 ft non-loadbearing wall of 20 GA×3⅝" steel studs spaced 24" o.c. On the cold side, one layer of 1/8 thick Hardiboard® fiber-cement face skin laminated to 1/2" thick Hardirock® "Max C"™ gypsum board was applied perpendicular (horizontally) to 20 GA.×3⅝" steel studs 24" o.c. with minimum 1" long Type S drywall screws 12" o.c. at floor and ceiling runners and intermediate studs. Fasteners were placed approximately 3" in from panel corners and approximately 3/8" in from panel edges. On the fire side, one layer of 1/8" thick Hardiboard® fiber-cement face skin laminated to 1/2" thick Hardirock® "Max C"™ gypsum board was applied perpendicular (horizontally) to 20 GA.×3⅝" steel studs 24" o.c. with minimum 1" long Type S drywall screws 12" o.c. at floor and ceiling runners and intermediate studs. Fire side horizontal panel joints were offset from cold side horizontal panel joints by 24". Fasteners were placed approximately 3" in from framing corners and approximately 3/8" in from panel edges.

Framing members in fire-rated wall assemblies are cut 3/4" shorter than full height of wall thereby creating a floating frame wall. In order to transport these walls from the fire test facility to the sound test facility, fasteners were placed through the wall panels into framing members at floor and ceiling runner tracks to provide racking resistance to facilitate specimens handling. This modification does not change the sound transmission characteristics of the wall assembly.

Joints were treated with chemically-setting powder gypsum joint compound (USG® Durabond® 90), complying with ASTM Specification C 475, for flush joining the panel edges. Setting-type compound was mixed in accordance with manufacturer's written instructions. Compound was applied to fastener heads and joint recess was formed by adjoining sheets. Perforated paper reinforcing tape was immediately imbedded centrally into the joints. Perforated paper reinforcing tape was immediately imbedded with additional compound and allowed to dry.

The ambient temperature at the start of the test was 80° F., with a relative humidity of 84%. Throughout the fire test, the pressure differential between the inside of the furnace (measured at a point 1/3 of the way down from the top center of the wall specimen) and the laboratory ambient air was maintained at −0.03 inches of water column, which resulted in a neutral pressure at the top of the test article.

Observations made during the test were as follows:

| Time (min:sec) | Observation |
|---|---|
| 0:00 | Furnace fired at 8:52 a.m. |
| 1:43 | Applicant's laminated composite panel separating out-of-plane (OOPS) at top horizontal joint on the fire side |
| 2:20 | Surface of Applicant's laminated composite panel cracking and turning black |

-continued

| Time (min:sec) | Observation |
| --- | --- |
| 3:25 | Laminate peeling and falling off exposed surface |
| 4:15 | Much of the laminate has fallen away; exposed gypsum paper flaming |
| 7:13 | Gypsum paper black/gray and flaking on fire side |
| 10:30 | All of the laminate has fallen off exposed surface |
| 32:30 | ~⅛" gap at the bottom horizontal joint on the exposed side |
| 39:00 | ~½" OOPS at the bottom horizontal joint near center of wall on the exposed side. |
| 60:00 | The furnace was extinguished and the test article removed and exposed to the standard hose stream test. |
| Hose Stream | The wall was exposed to the standard hose stream test for at a pressure of 30 psi from 20 feet away from the exposed surface for a period of 60 seconds. The test article failed the hose stream test when the hose stream penetrated the wall after 19 seconds. |

During the fire test, the wall was measured for deflection at three points along its vertical centerline: at 30" (position #1), 60" (position #2) and 90" (position #3) from the left side of the wall. Measurements were made from a taut string to the wall surface at each location.

| TIME (min) | Position #1 (in.) | Position #2 (in.) | Position #3 (in.) |
| --- | --- | --- | --- |
| 0 | 5⅜ | 5⅜ | 5½ |
| 10 | 5⅝ | 5⅝ | 5⅞ |
| 20 | 6¼ | 6½ | 6½ |
| 30 | 6¾ | 6¾ | 6⅞ |
| 40 | 6½ | 6¼ | 6½ |
| 50 | 6¼ | 5⅞ | 6¼ |
| 60 | 6¼ | 6 | 6½ |

Hose Stream Retest

In accordance with the standard, a duplicate specimen was subjected to a fire exposure test for a period equal to one half of that indicated as the resistance period in the fire endurance test, immediately followed by the hose stream test.

Observations made during the test were as follows:

| Time (min:sec) | Observation |
| --- | --- |
| 0:00 | Furnace fired at 1:37 p.m. |
| 0:53 | Applicant's laminated composite panel cracking on the exposed side |
| 1:20 | Applicant's laminated composite panel turning black |
| 2:40 | Gypsum paper turning brown where laminate has fallen off |
| 3:00 | Exposed gypsum paper ignited |
| 4:25 | Exposed gypsum paper stopped flaming |
| 11:00 | Much of the laminate is gone, gypsum paper turning white |
| 30:00 | The furnace was extinguished and the test article removed and exposed to the standard hose stream test. |
| Hose Stream | The wall was exposed to the standard hose stream test for 60 seconds at a pressure of 30 psi from 20 feet away from the exposed surface. The test article withstood the hose stream test without allowing passage of water through the wall. |

Conclusions from Fire Testing

The 20 GA., 3⅝" galvanized steel stud wall with Applicant's laminated composite panels (⅛" thick Hardiboardg fiber-cement face skin laminated to ½" thick Hardirock® "Max C"™ gypsum wallboard) on both surfaces, constructed and tested as described in this report, achieved a non-loadbearing fire resistance rating of 60 minutes for a symmetrical wall assembly according to the ASTM E119 standard.

Summary of Advantages

The preferred embodiments of the present invention combine fire resistance of at least 1 hour and significant abuse and impact resistance in a prefabricated single piece laminate composite comprising fiber-cement laminated to gypsum. These properties are achieved in a laminate composite which in one embodiment is only about ⅝" thick that is not excessively heavy, is easy to cut and is quick and easy to install.

One disadvantage of the two layer systems of the prior art is that the individual pieces of fiber-cement and gypsum must be self-supporting in order to facilitate their individual installation. The layers of fiber-cement and gypsum, therefore, are limited in how thin they can be in order to remain self-supporting. The preferred embodiments of the present invention, however, combine the fiber-cement and gypsum layers into a prefabricated single piece laminate composite for installation. Thus, the individuals layers of fiber-cement and gypsum need not be self-supporting, and the thickness of the fiber-cement layer, for instance, can be significantly reduced. This reduces the overall thickness of the single piece laminate composite as compared to the two piece systems. As a result, one embodiment of the present invention incorporates a ⅛" fiber-cement layer and a ½" gypsum layer to create a single piece laminate composite about ⅝" thick, that simultaneously achieves a one hour fire resistance rating and abuse and impact resistance.

The embodiments illustrated and described above are provided merely as examples of certain preferred embodiments of the present invention. Various changes and modifications can be made from the embodiments presented herein by those skilled in the art without departing from the spirit and scope of the invention.

What is claimed is:

1. A building material comprising:
   a pre-fabricated fiber-cement sheet;
   a gypsum panel; and
   an adhesive layer wherein the adhesive layer is not integral to the pre-fabricated fiber-cement sheet, wherein the adhesive layer is interposed between the fiber-cement sheet and the gypsum panel, wherein the fiber-cement sheet is laminated to the gypsum panel with the adhesive layer to form a single piece laminate composite having a fire resistance rating of at least one hour according to ASTM E 119-98.

2. The building material of claim 1, wherein the adhesive layer comprises polyvinyl acetate.

3. The building material of claim 1, wherein the adhesive layer comprises material selected from the group consisting of water-based polymeric adhesives, solvent-based adhesives, thermoset adhesives, natural polymers such as modified starches, liquid moisture cure or reactive hot melt adhesives such as polyurethane, heat or fire resistant adhesives, and any combinations thereof.

4. The building material of claim 1, wherein the adhesive layer is between about 4.5 mils and 6 mils thick.

5. The building material of claim 1, wherein the building material has a thickness of about ⅝ inch.

6. The building material of claim 1, wherein the prefabricated fiber-cement panel contains cellulose fibers.

7. A building material, comprising:
   a fiber-cement layer containing cellulose fibers; and
   a gypsum layer, wherein the gypsum layer is laminated to the fiber cement layer for form a single piece laminate composite.

8. The building material of claim 7, wherein the single piece laminate composite has a fire resistance rating greater than that of either the fiber-cement layer or the gypsum layer individually.

9. The building material of claim 7, wherein the single piece laminate composite has a thickness of about 5/8 inch.

10. The building material of claim 9, wherein the fiber-cement layer has a thickness of about 1/8 inch.

11. The building material of claim 9, wherein the gypsum layer has a thickness of about 1/2 inch.

12. The building material of claim 7, wherein the fiber-cement layer is laminated to the gypsum layer with a discrete adhesive layer that is not integrally formed as part of the fiber-cement layer, wherein the adhesive layer is applied to the fiber-cement layer after the fiber-cement layer is formed.

13. The building material of claim 12, wherein the fiber-cement layer is laminated to the gypsum layer with an adhesive that is between about 4.5 mil and 6 mil thick.

14. The building material of claim 7, wherein the fiber-cement layer has a thickness such that the fiber-cement layer individually is not self supporting.

15. A building material, comprising:
a pre-fabricated fiber-cement panel; and
a gypsum panel, wherein the gypsum panel is laminated to the pre-fabricated fiber-cement panel to form a single piece laminate composite.

16. The building material of claim 15, wherein the building material has a thickness of about 5/8 inch.

17. The building material of claim 15, wherein the pre-fabricated fiber-cement panel contains cellulose fibers.

18. The building material of claim 15, wherein the pre-fabricated fiber-cement panel has a density of up to 2.0 g/cm$^3$.

19. The building material of claim 15, wherein the single piece laminate composite has a fire resistance rating of at least one hour according to ASTM E 119-98.

20. The building material of claim 15, wherein the pre-fabricated fiber cement panel and the gypsum panel are laminated to each other using an adhesive.

* * * * *